US012397958B2

(12) United States Patent
Bardini

(10) Patent No.: US 12,397,958 B2
(45) Date of Patent: Aug. 26, 2025

(54) CUTTING DRUM FOR A LABELING MACHINE

(71) Applicant: P.E. LABELLERS S.P.A., Porto Mantovano (IT)

(72) Inventor: Riccardo Bardini, Torri del Benaco (IT)

(73) Assignee: P.E. LABELLERS S.P.A., Porto Mantovano (IT)

( * ) Notice: Subject to any disclaimer, the term of this patent is extended or adjusted under 35 U.S.C. 154(b) by 190 days.

(21) Appl. No.: 18/025,662

(22) PCT Filed: Sep. 28, 2021

(86) PCT No.: PCT/EP2021/076600
§ 371 (c)(1),
(2) Date: Mar. 10, 2023

(87) PCT Pub. No.: WO2022/069447
PCT Pub. Date: Apr. 7, 2022

(65) Prior Publication Data
US 2023/0339642 A1 Oct. 26, 2023

(30) Foreign Application Priority Data
Sep. 29, 2020 (IT) ........................ 102020000022891

(51) Int. Cl.
*B65C 9/18* (2006.01)

(52) U.S. Cl.
CPC .... *B65C 9/1826* (2013.01); *B65C 2009/1838* (2013.01)

(58) Field of Classification Search
CPC .......... B26C 9/1826; B65C 2009/1838; B65C 9/1803; B65C 9/1807; B65C 9/32;
(Continued)

(56) References Cited

U.S. PATENT DOCUMENTS 3,865,164 A * 2/1975 Sybertz .................. B27G 13/04 241/292.1
4,632,721 A * 12/1986 Hoffmann ................. B65C 9/36 156/578
(Continued)

FOREIGN PATENT DOCUMENTS

DE 102015215499 A1 2/2017
EP 2759484 A1 7/2014
(Continued)

OTHER PUBLICATIONS (PCT) European Patent Office, International Search Report and Written Opinion of the International Searching Authority, International Application No. PCT/EP2021/076600, 10 pages, Jan. 4, 2022.

*Primary Examiner* — Ghassem Alie
(74) *Attorney, Agent, or Firm* — THOMPSON HINE LLP

(57) ABSTRACT

A cutting drum for labeling machine, which includes a drum main body designed to receive in adhesion a label ribbon on which multiple labels are printed in succession; along the perimeter of the drum main body there is at least one cutting device which includes a respective suction chamber, which accommodates at least one blade; the suction chamber is connectable to air suction elements, in order to attract the label ribbon toward the inside of the suction chamber and against the blade, in order to produce the cutting of the label ribbon; the cutting device comprises a respective box-like body for supporting the blade which forms internally the suction chamber and is detachably supported by the drum main body; the blade is coupled to the box-like body by virtue of detachable retention elements.

17 Claims, 12 Drawing Sheets

(58) Field of Classification Search

CPC ........... B65C 9/1819; B65C 9/02; B65C 9/08; B65H 7/2614; B65H 35/06; B65H 2301/51532; B65H 2801/75; B26D 7/26; B26D 1/623; A47K 10/3606

USPC .......... 83/177, 346, 331, 343, 674, 668.699, 83/698.31, 698, 698.42, 69, 8.51, 698.61, 83/698.41, 663

See application file for complete search history.

(56) References Cited

U.S. PATENT DOCUMENTS

| | | | | | |
|---|---|---|---|---|---|
| 5,086,683 | A * | 2/1992 | Steidinger | B26D 7/2614 | 83/346 |
| 5,282,409 | A * | 2/1994 | Rojas | B26D 7/2614 | 83/674 |
| 2008/0066829 | A1 * | 3/2008 | Garcia | B27G 13/04 | 144/172 |

FOREIGN PATENT DOCUMENTS

| | | | | |
|---|---|---|---|---|
| EP | 2772448 | A1 | 9/2014 | |
| JP | S 47-045199 | A | 1/1974 | |
| JP | S 63-152531 | A | 6/1988 | |
| JP | 2002-221003 | A | 8/2002 | |
| JP | 101419493 | B1 * | 11/2013 | B65H 35/0073 |
| WO | 2015/173091 | A1 | 11/2015 | |
| WO | 2019/243203 | A1 | 12/2019 | |

* cited by examiner

CUTTING DRUM FOR A LABELING MACHINE

The present invention relates to a cutting drum for a labeling machine.

As is known, labeling machines are used which allow to apply to containers labels obtained by cutting a continuous label ribbon that is wound on a spool and can be provided with portions of glue on the face of the labels designed to come into contact with the containers or can be glue-free and, in this case, the machine is equipped with an adapted assembly for applying the glue to the labels.

Typically, labeling machines have a conveyor for the containers, usually constituted by a rotating carousel provided peripherally with plates for supporting the individual containers which allow to rotate the containers about the corresponding axes.

At least one labeling unit is arranged along the perimeter of the carousel and generally has an unwinding assembly that is designed to unwind the label ribbon from its spool and feed it to a cutting drum which is provided with suction ports on its lateral surface in order to ensure the retention of the label ribbon in adhesion on the lateral surface of the cutting drum itself and is provided with blades, which are fixed on the drum and operate in cooperation with a fixed contrast blade, to cut the label ribbon at the region between two consecutive labels.

The labels separated after cutting are then released by the cutting drum to a transfer drum, which brings them in adhesion on the respective container that is arriving on the carousel.

The cutting drum described above has the drawback of requiring precise adjustment of the position of the blades that are fixed to the cutting drum and of the fixed blade in order to ensure the correct execution of the cutting of the labels.

Labeling machines are also known in which the cutting drum is provided with blades which are moved by respective actuation cylinders, in order to allow to perform the cutting of the label ribbon without requiring the presence of the fixed contrast blade.

This type of solution, although valid, has a certain constructive complexity.

In order to overcome this and other drawbacks of the background art, a cutting drum, described in U.S. Pat. No. 10,343,808 in the name of the this same Applicant, has been proposed which is designed to receive, on its lateral surface, the label ribbon fed by the unwinding assembly and is provided, around its lateral surface, with a plurality of cutting devices, each of which comprises a blade which is integrally fixed to the cutting drum and is accommodated in a respective suction chamber, which is formed in the cutting drum and is open at the lateral surface of said cutting drum.

The suction chamber of each cutting device can be connected to air suction means, which allow to draw the label ribbon toward the inside of the suction chamber, so as to push it against the blade, thus cutting it.

Although the cutting drum described above does not require a precise adjustment of the position of the blades in order to cut the label ribbon correctly, and although it is constructively rather simple to provide, it entails however a certain laboriousness in the operations for removing worn blades and replacing them with new ones.

The aim of the present invention is to provide a cutting drum for a labeling machine that is capable of improving the background art in one or more of the aspects mentioned above.

Within this aim, an object of the invention is to provide a cutting drum that allows to perform the replacement of the worn blades in a very simple and practical manner.

Another object of the invention is to provide a cutting drum for a labeling machine that is constructively simple to provide.

Another object of the present invention is to provide a cutting drum for a labeling machine which can offer the greatest assurances of reliability and safety in its operation.

A further object of the present invention is to overcome the drawbacks of the background art in a manner that is alternative to any existing solutions.

Not least object of the invention is to provide a cutting drum that is competitive also from a purely economic standpoint.

This aim and these and other objects which will become better apparent hereinafter are achieved by a cutting drum for a labeling machine according to claim 1, optionally provided with one or more of the characteristics of the dependent claims.

Further characteristics and advantages of the present invention will become better apparent from the description of some preferred but not exclusive embodiments, of the cutting drum for a labeling machine according to the invention, illustrated by way of non-limiting example in the accompanying drawings, wherein.

Figure 1:
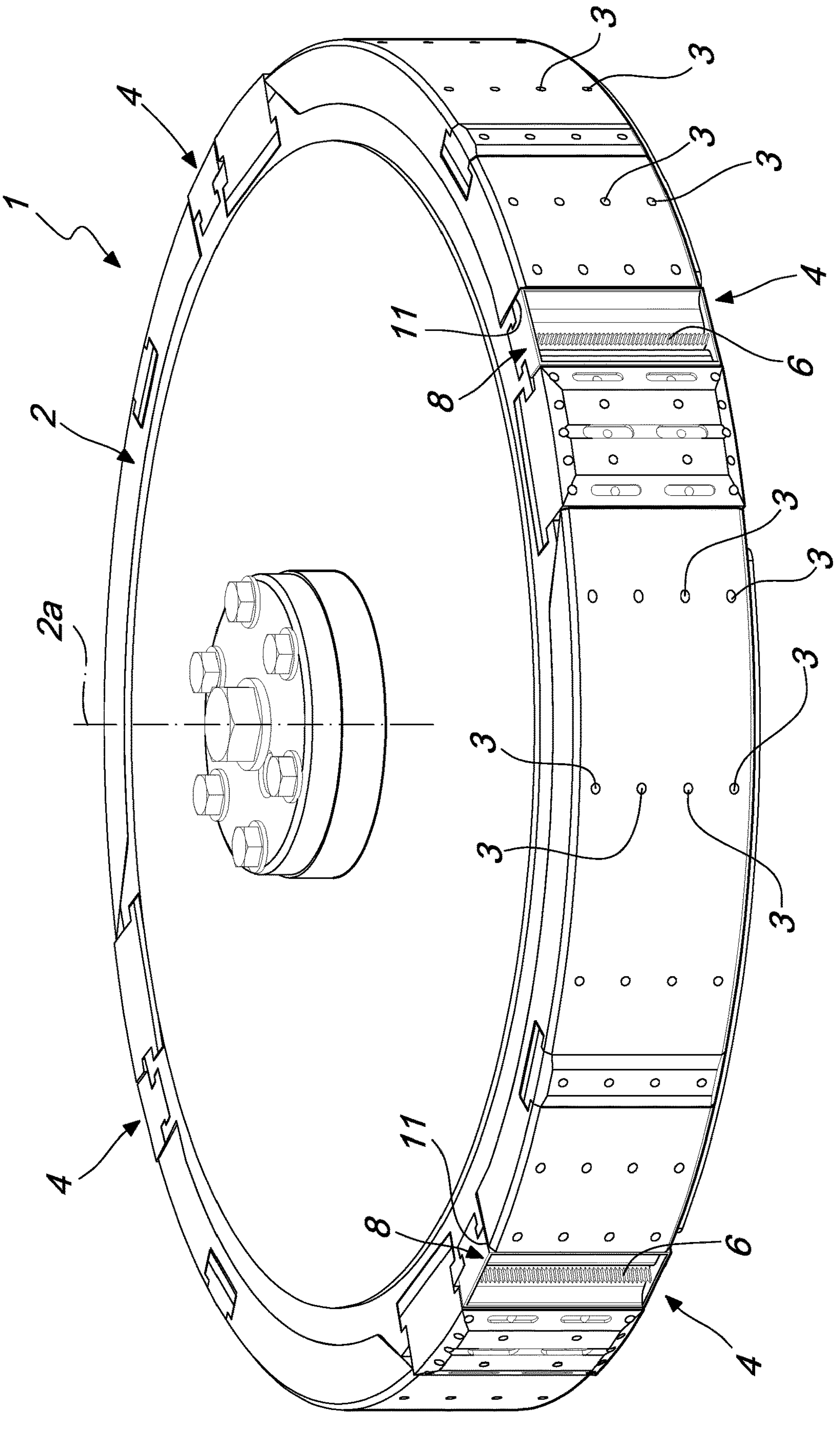
FIG. 1 is a perspective view of a cutting drum according to the invention.
Figure 2:
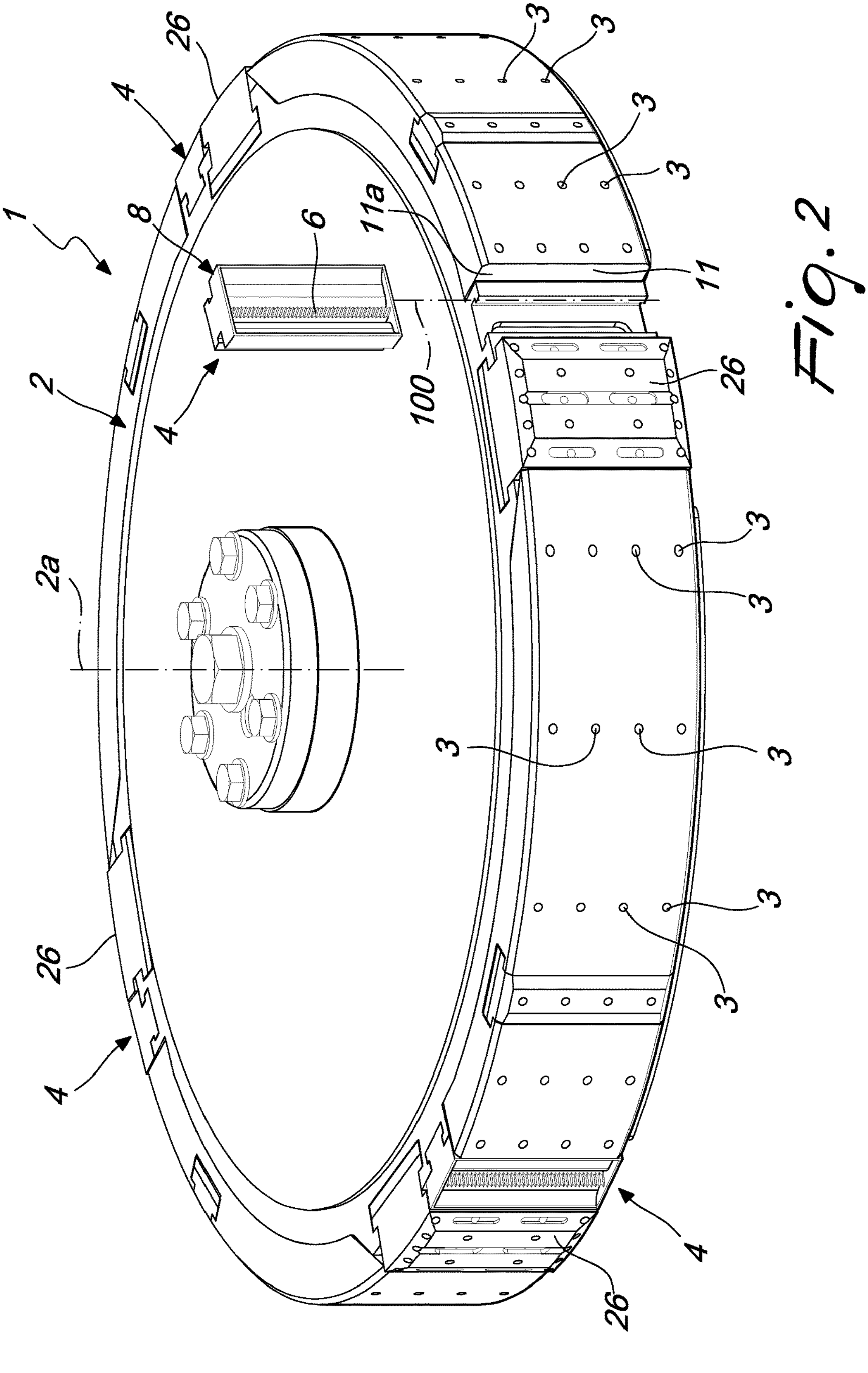
FIG. 2 is a perspective view of the cutting drum according to the invention with a cutting device extracted.

With reference to the figures, the cutting drum for labeling machines according to the invention, generally designated by the reference numeral 1, comprises a drum main body 2, which is substantially cylindrical, can be rotationally actuated about its own axis 2*a* and is designed to receive in adhesion on its own lateral surface a label ribbon 120, on which multiple labels are printed in succession and which can be fed to the drum main body 2 by an unwinding assembly 130, which is provided for example with a pair of traction rollers 130*a* and 130*b*, which pick up the label ribbon 120 from a spool.

In particular, suction ports 3 are provided on the lateral surface of the drum main body 2 in a per se known manner and allow to retain the label ribbon 120, as well as the labels separated after cutting, on said lateral surface of the drum main body 2.

Along the perimeter of the drum main body 2 there is at least one cutting device 4, which comprises a respective suction chamber 5, which is open at the lateral surface of the drum and in which at least one blade 6 is accommodated which is conveniently arranged substantially along a diametrical plane of the drum main body 2.

The suction chamber 5 is connectable to air suction means 7, in order to be able to draw the label ribbon 120 toward the inside of the suction chamber 5 and against the blade 6, so as to produce the cutting of the label ribbon 120, at the region of separation between two consecutive labels.

It should be noted that multiple cutting devices 4 may also be provided which are arranged along the peripheral region of the drum main body 2 and are arranged at a mutual circumferential distance that is at least equal to the length of the labels.

According to the invention, the or each cutting device 4 comprises a respective box-like body 8 for supporting the blade 6, which forms internally the suction chamber 5.

Also according to the invention, the box-like body 8 is detachably supported by the drum main body 2, so that it can be removed from the drum main body 2 in case of maintenance or if it is necessary to remove the blade 6.

Furthermore, the blade 6 is, in turn, coupled to the box-like body 8 by virtue of detachable retention means, so that it can be uncoupled from the box-like body 8 in order to be able to replace it with a new blade 6 if it is damaged or worn.

Advantageously, the box-like body 8 can be coupled or uncoupled with respect to the drum main body 2 by means of a relative sliding movement between the box-like body 8 and the drum main body 2 along a sliding direction 100.

Preferably, the detachable retention means of the blade 6 are extended along at least one retention direction that is substantially perpendicular to the plane of arrangement of the blade 6 and are adapted to contrast the exit of the blade 6 from the box-like body 8.

Advantageously, the sliding direction 100 along which the relative sliding movement occurs which allows the coupling or uncoupling of the box-like body 8 with respect to the drum main body 2 has at least one component that is substantially perpendicular to the direction along which the centrifugal force acts on the blade 6, i.e., to a substantially radial direction with respect to the axis 2*a* of the drum main body 2.

Preferably, the sliding direction 100 is in practice substantially parallel to the axis of rotation 2*a* of the drum main body 2.

Conveniently, the detachable retention means of the blade 6 are provided by at least one locking pin 9 which engages detachably a corresponding through engagement opening 10 formed in the blade 6.

Preferably, there are multiple locking pins 9 which engage respective through engagement openings 10 formed along the longitudinal extension of the blade 6.

It should be noted that conveniently, at the peripheral region of the drum main body 2 there is, for the box-like body 8 of the or each cutting device 4, at least one complementarily shaped accommodation seat 11, which is conveniently open on the lateral surface of the drum main body 2.

Advantageously, the box-like body 8 is in practice extractable from or insertable in the accommodation seat 11, conveniently through an access opening 11*a* formed on an axial face of the drum main body 2, by means of such relative sliding movement.

Conveniently, a suction opening 12 is formed on the face of the box-like body 8 that is designed to be directed outward, communicates with the suction chamber 5 and allows to draw toward the inside of the suction chamber 5 the label ribbon 120 so as to allow the blade 6 to cut it.

Conveniently, with the box-like body 8 inserted in the accommodation seat 11 the suction opening 12 is arranged substantially at the lateral surface of the drum main body 2.

It should be noted that it is advantageously possible to provide means for the detachable snap locking of the box-like body 8 in the accommodation seat 11, which can be activatable automatically upon the insertion of the box-like body 8 in the accommodation seat 11.

Preferably, the box-like body 8 is provided with at least one coupling portion 13 which can engage at least one respective coupling seat 14 that is shaped correspondingly, is formed in the drum main body 2 and communicates with the accommodation seat 11, in order to facilitate the sliding movement of the box-like body 8 that allows its coupling or uncoupling with respect to the drum main body 2 and prevent, at the same time, the possibility of movement of the box-like body 8 with respect to the drum main body 2 along at least one direction that is substantially perpendicular to the sliding direction 100 along which the relative sliding movement that allows the coupling or uncoupling of the box-like body 8 with respect to the main body 2 occurs.

Advantageously, the coupling portion 13 may have a substantially dovetail shape.

More particularly, the coupling portion 13 comprises at least one rib 15, which protrudes from the external surface of the box-like body 8 and is extended substantially parallel to the sliding direction 100 along which the relative sliding movement that allows the coupling or uncoupling of the box-like body 8 with respect to the drum main body 2 occurs.

In particular, the rib 15 is insertable in a corresponding groove 16 formed in the coupling seat 14.

Advantageously, the coupling portion 13 further comprises, at the free end of the rib 15, at least one lateral expansion 17 which can engage a respective region 18, which is wider with respect to the groove 16 and is also formed in the coupling seat 14.

Optionally, it is also possible to provide a pair of mutually opposite lateral expansions 17*a* and 17*b*, each of which can engage a respective wider region 18*a*, 18*b* of the coupling seat 14.

Conveniently, the coupling portion 13 is arranged on the side of the box-like body that is opposite with respect to the side where the suction opening 12 is located.

Figure 3:
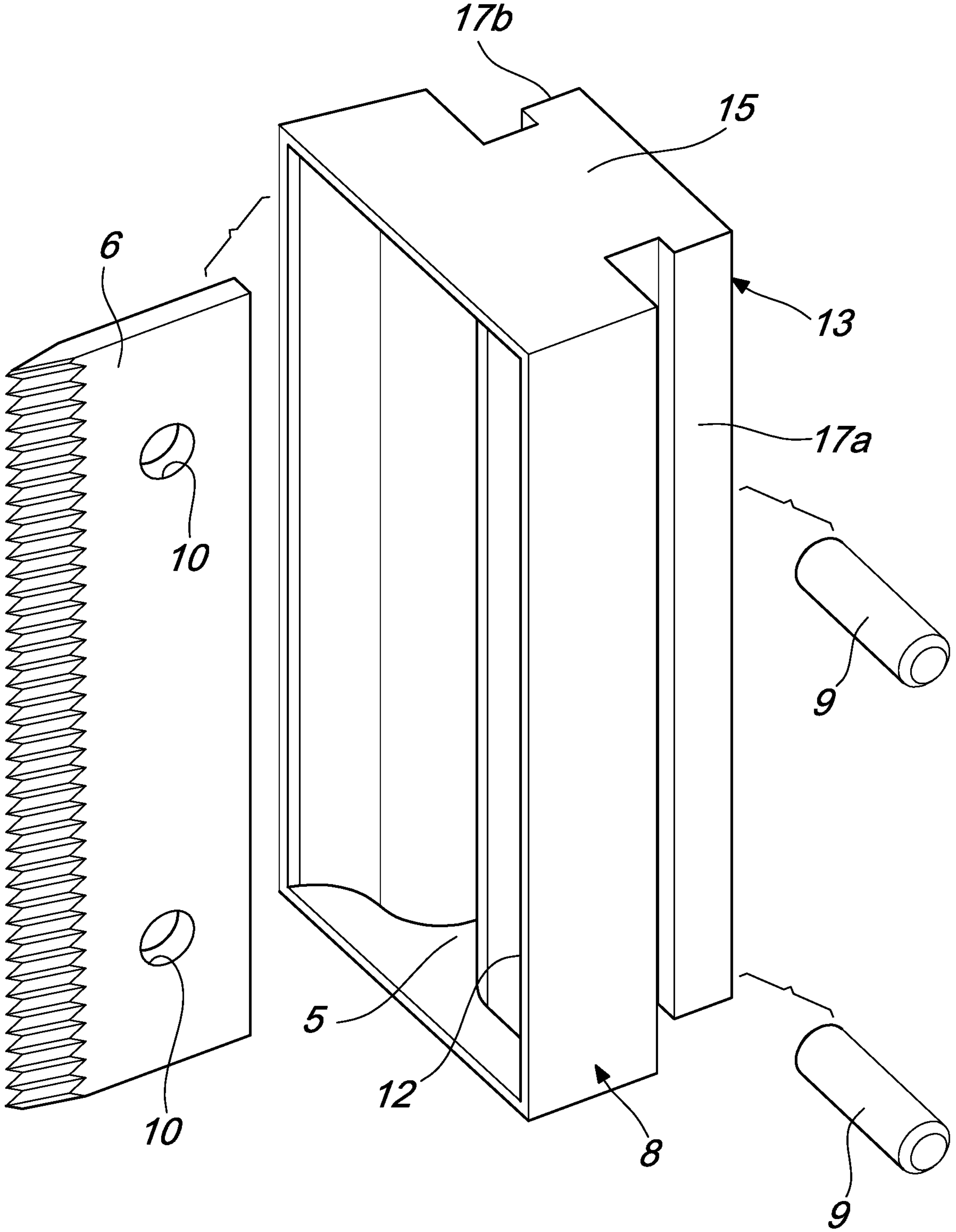
FIG. 3 is an exploded perspective view of a cutting device extracted from the cutting drum according to a first embodiment.
Figure 4:
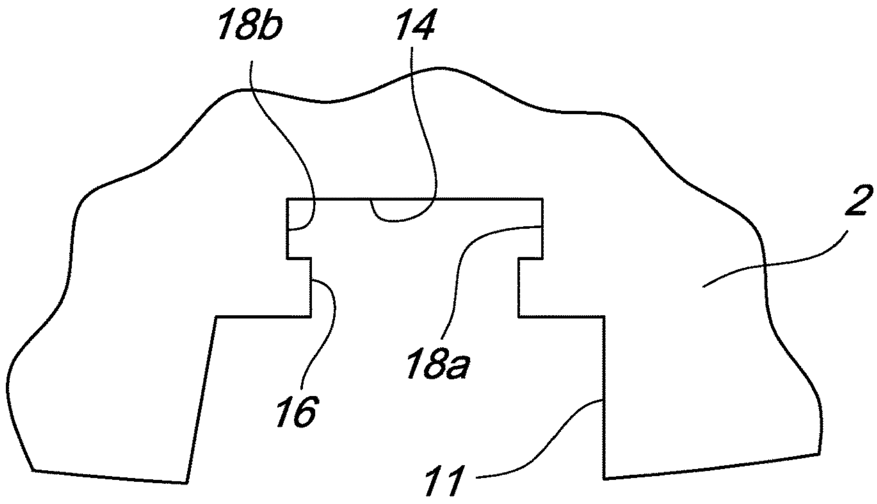
FIG. 4 is a schematic top plan view of an accommodation seat formed in the cutting drum to accommodate a cutting device.
Figure 5:
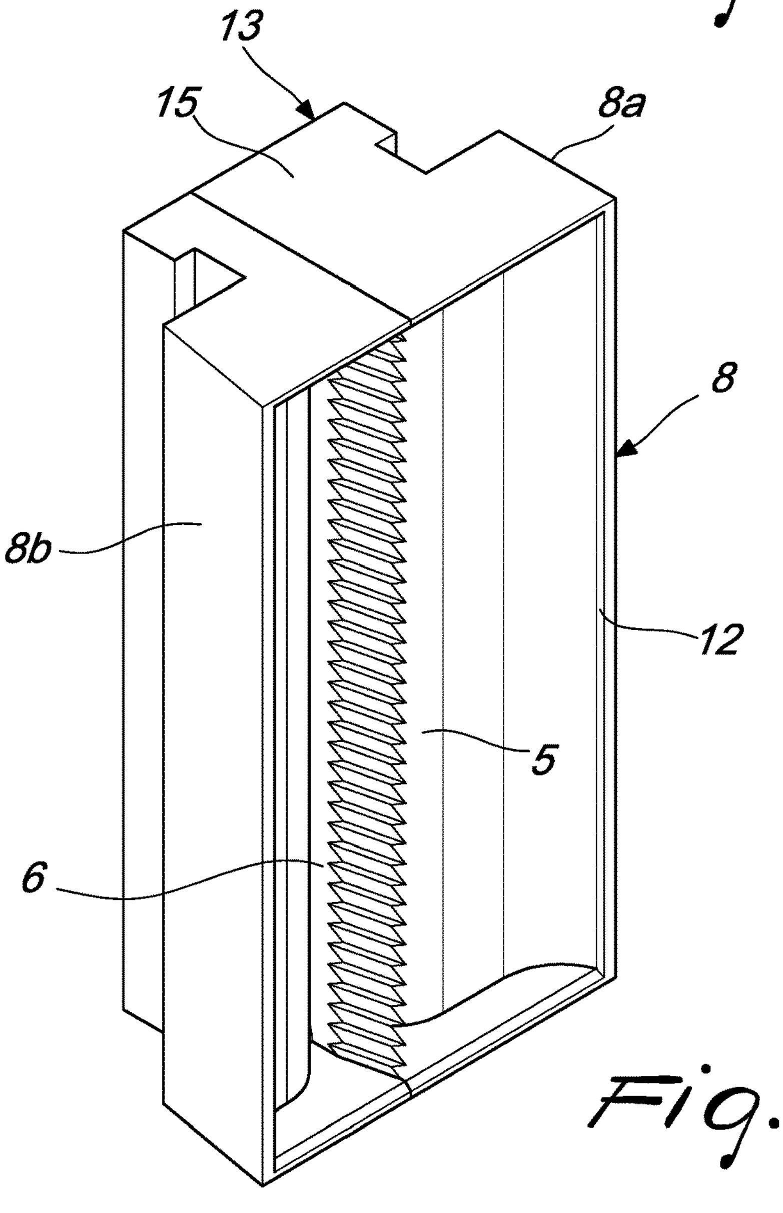
FIG. 5 is a perspective view of a second embodiment of the cutting device of the cutting drum according to the invention.
Figure 6:
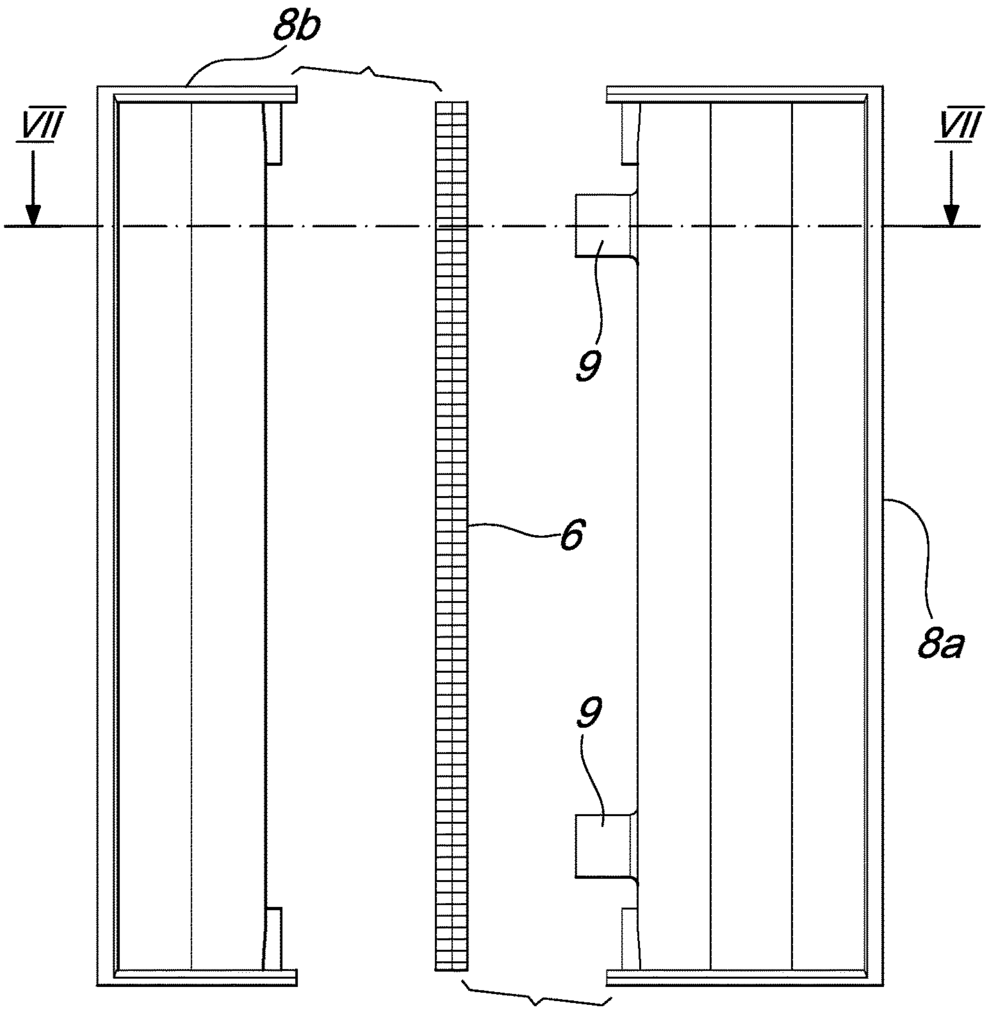
FIG. 6 is a is an exploded front view of the cutting device of FIG. 5.
Figure 7:
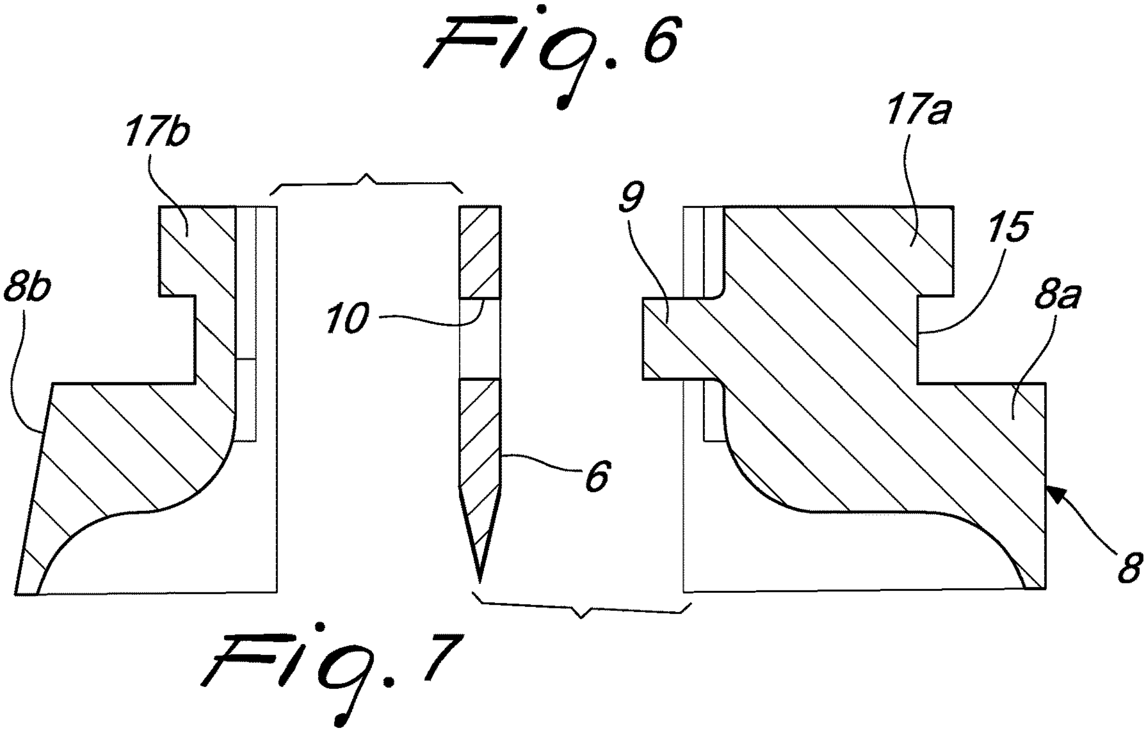
FIG. 7 is a sectional view, taken along the plane VII-VII of FIG. 6.
Figure 8:
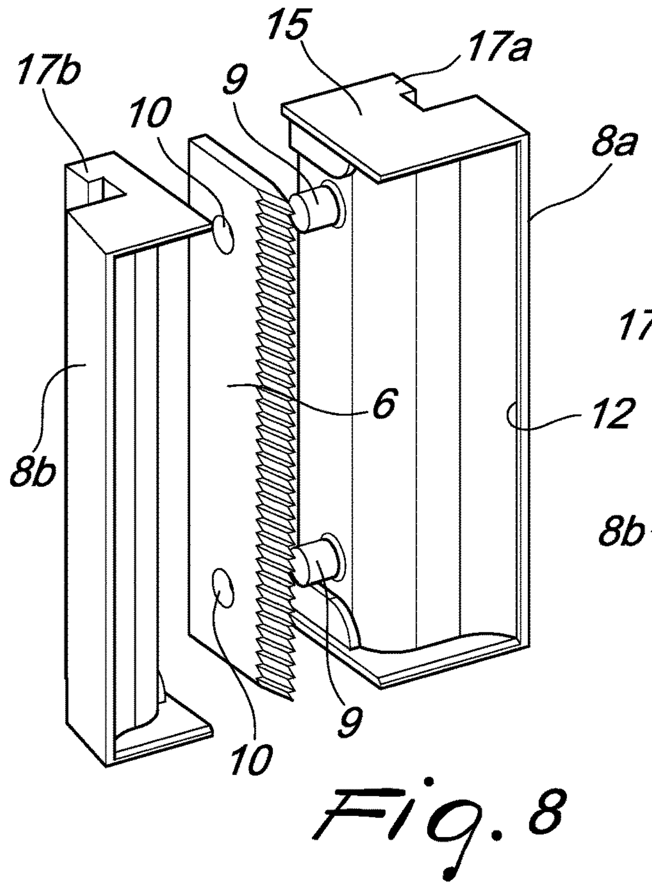
FIG. 8 is an exploded perspective view of the embodiment of FIG. 5.
Figure 13:
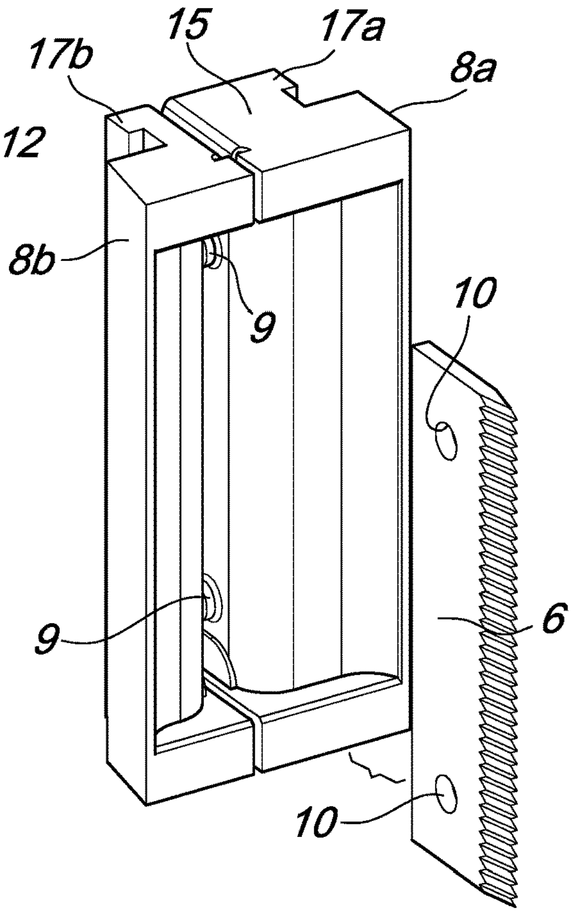
FIG. 13 is an exploded perspective view of the embodiment of FIG. 9.
Figure 18:
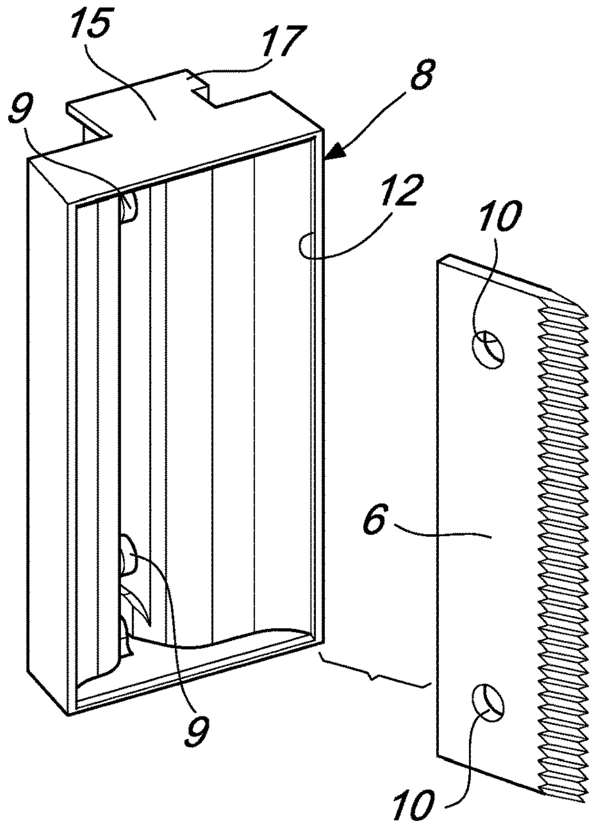
FIG. 18 is an exploded perspective view of the cutting device of FIG. 14.
Figure 9:
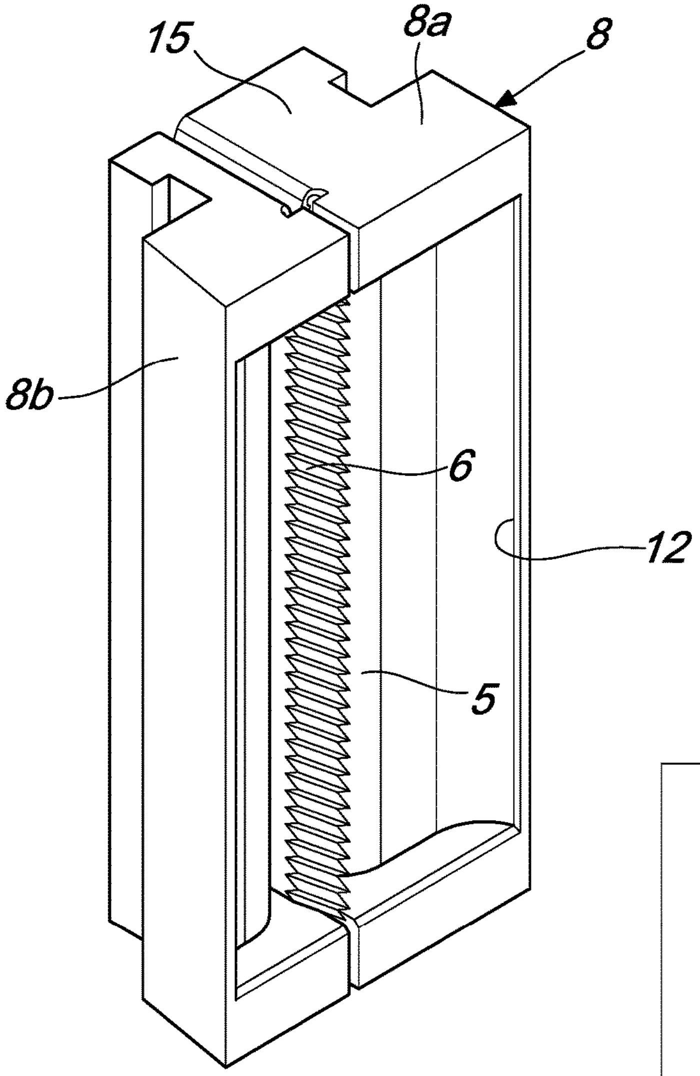
FIG. 9 is a perspective view of a third embodiment of the cutting device of the cutting drum according to the invention.
Figure 10:
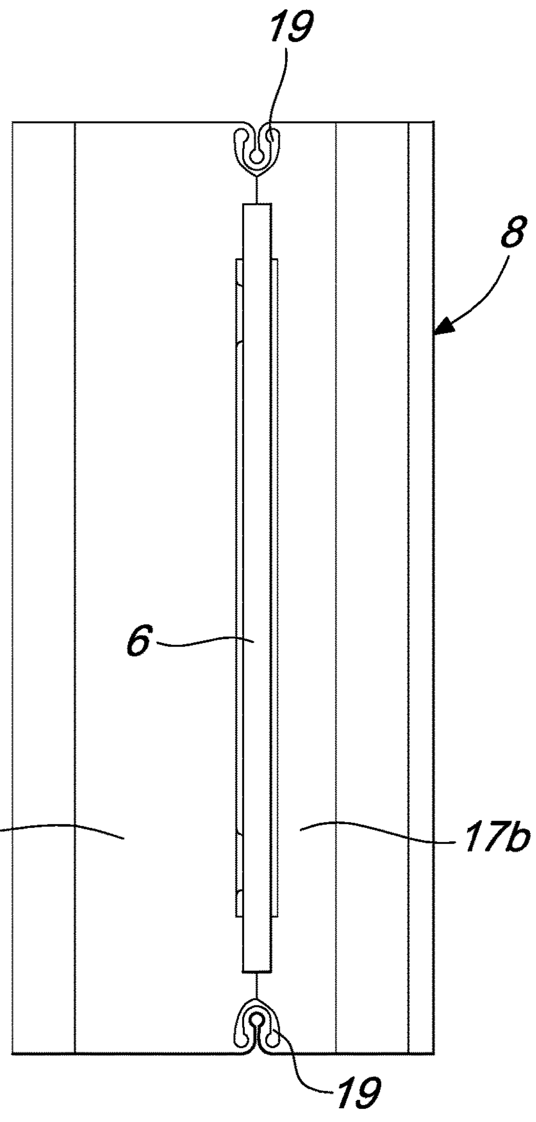
FIG. 10 is a rear view of the cutting device of FIG. 9.
Figure 11:
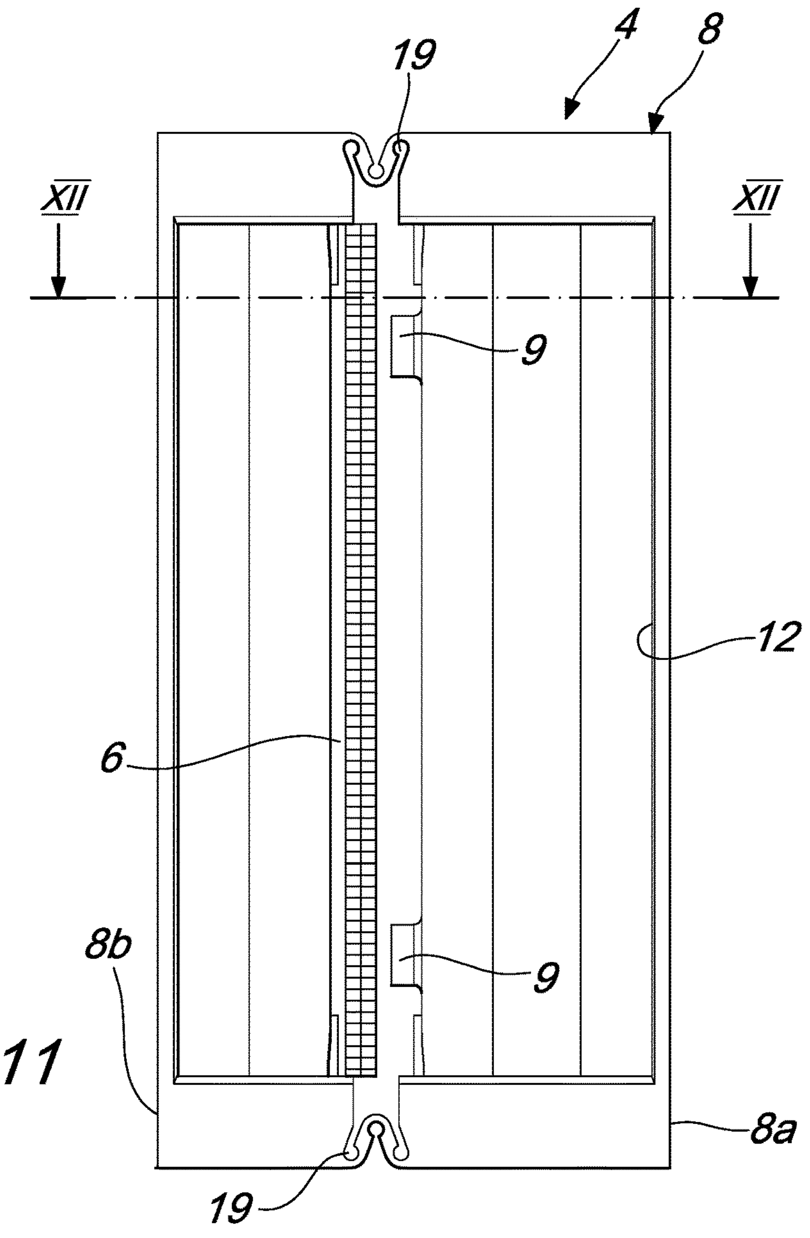
FIG. 11 is a slightly exploded front view of the cutting device of FIG. 9.
Figure 12:
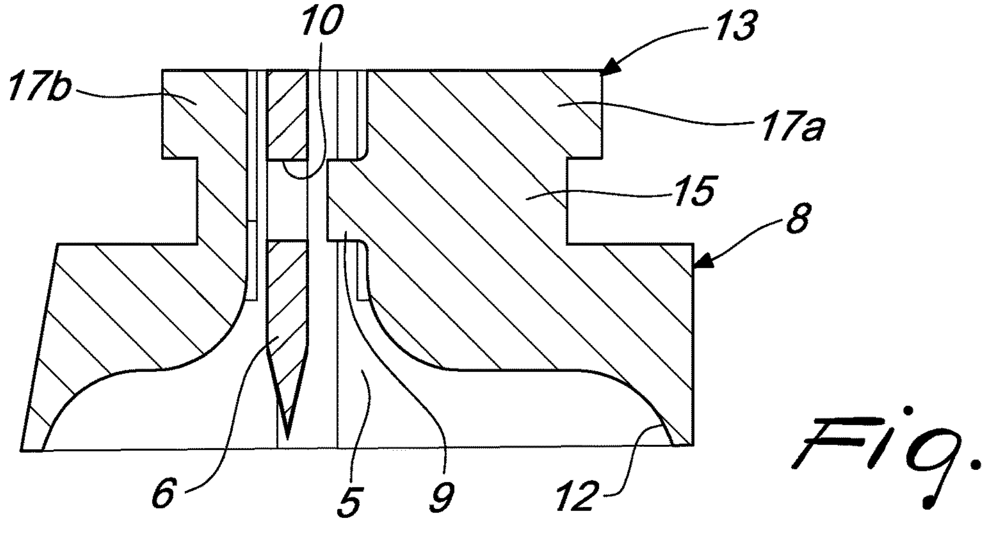
FIG. 12 is a sectional view, taken along the plane XII-XII of FIG. 11.
Figure 14:
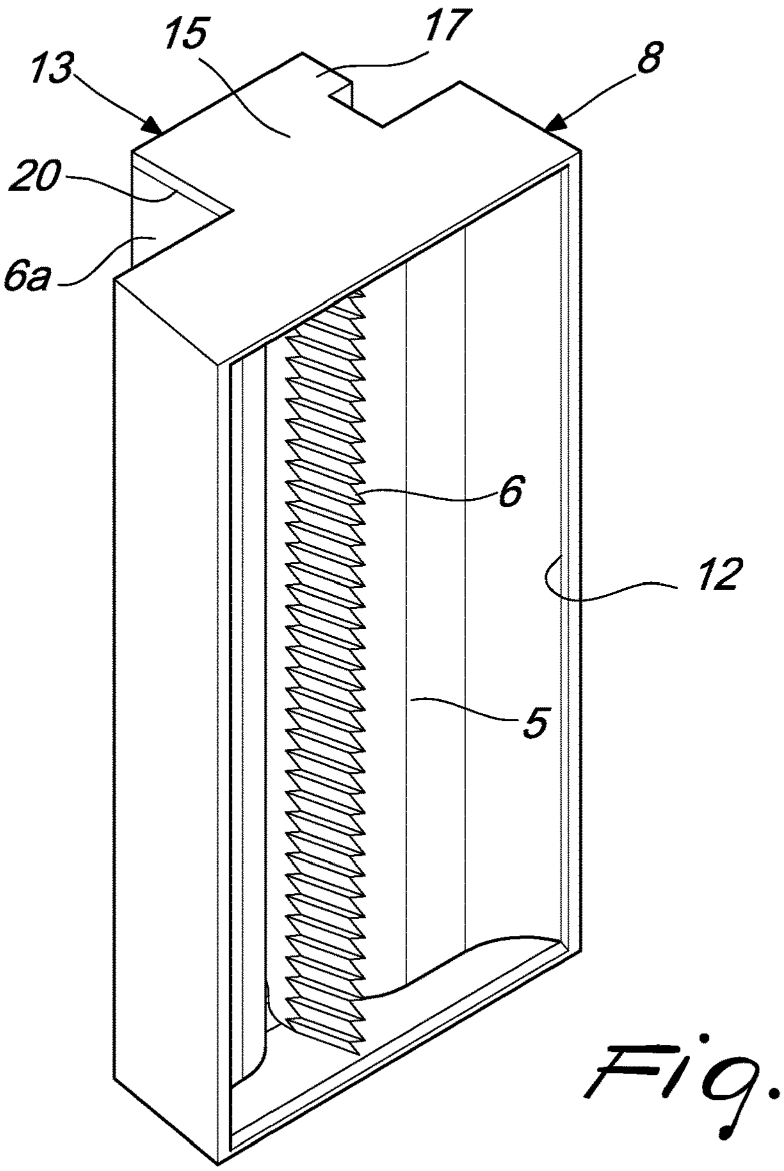
FIG. 14 is a perspective view of a fourth embodiment of the cutting device of the cutting drum according to the invention.
Figure 15:
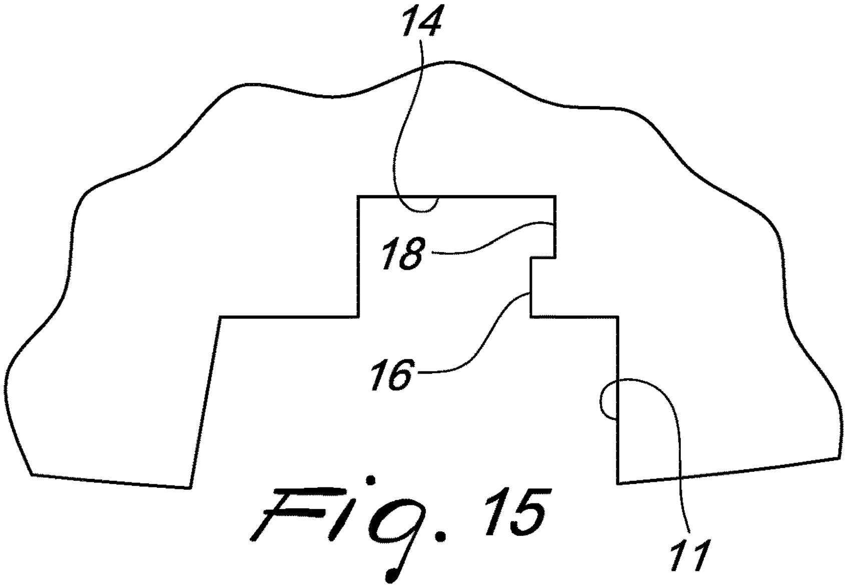
FIG. 15 is a schematic top plan view of the accommodation seat formed in the cutting drum to accommodate the cutting device of FIG. 14.
Figure 16:
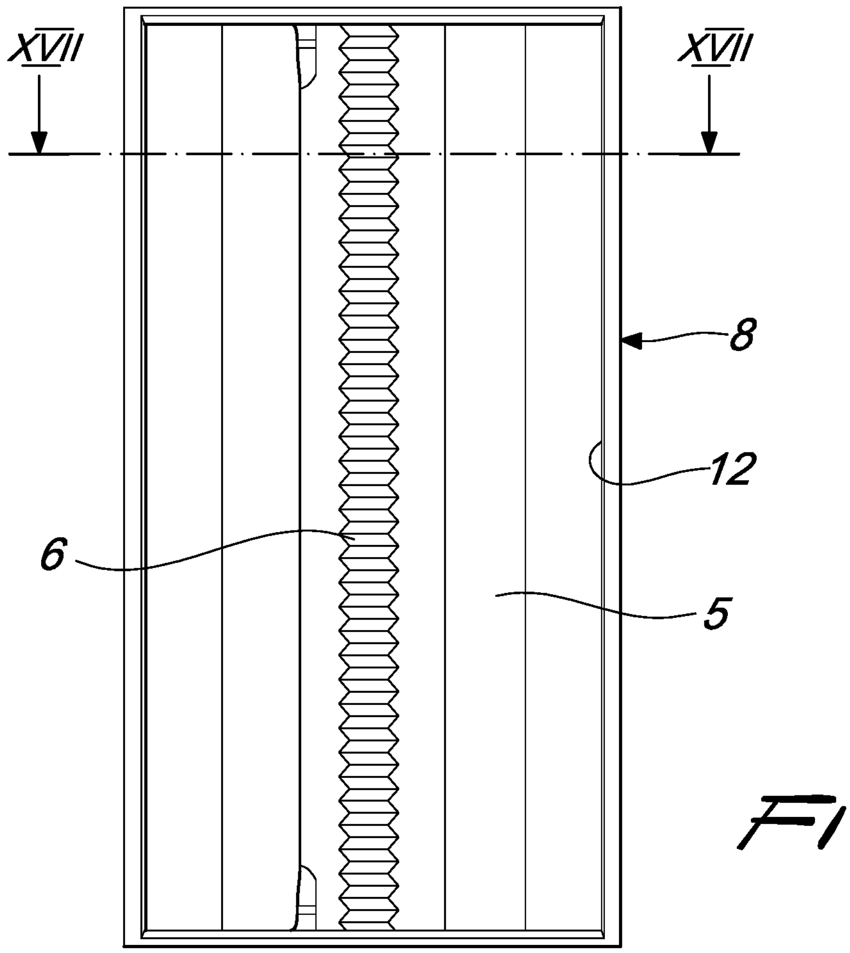
FIG. 16 is a front view of the cutting device of FIG. 14.
Figure 17:
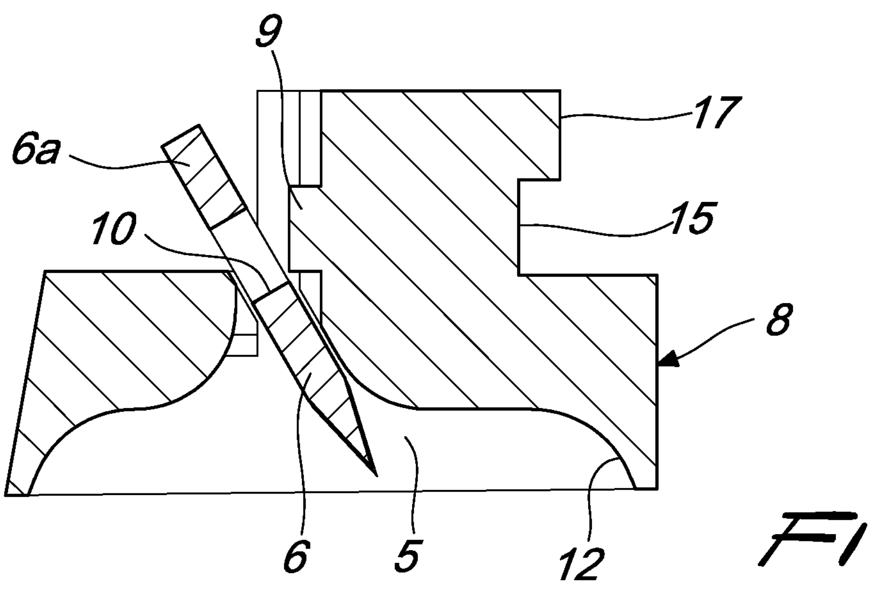
FIG. 17 is a sectional view, taken along the plane XVII-XVII of FIG. 16.
Figure 19:
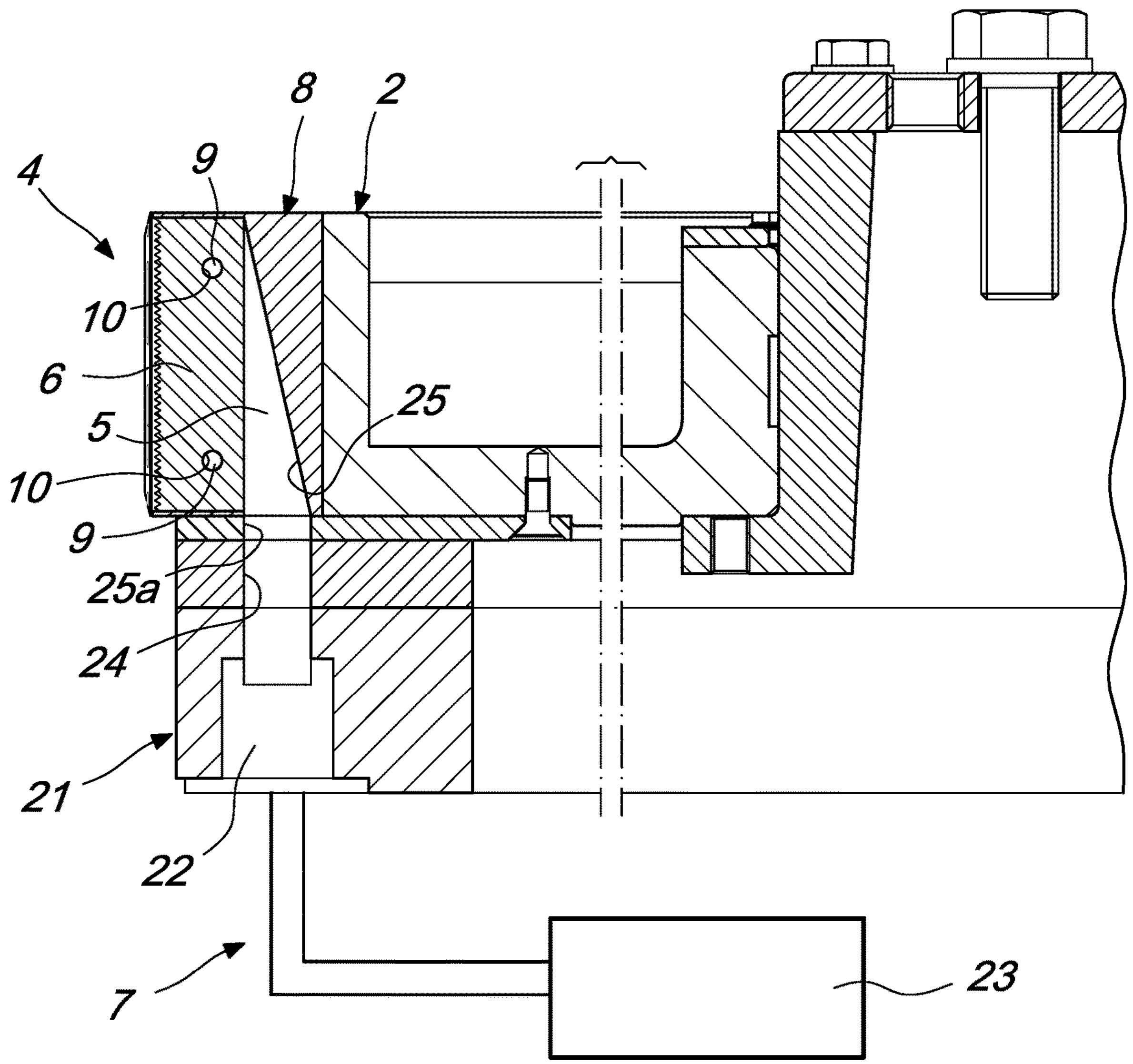
FIG. 19 is a schematic diametrical sectional view of a portion of the cutting drum according to the invention.
Figure 20:
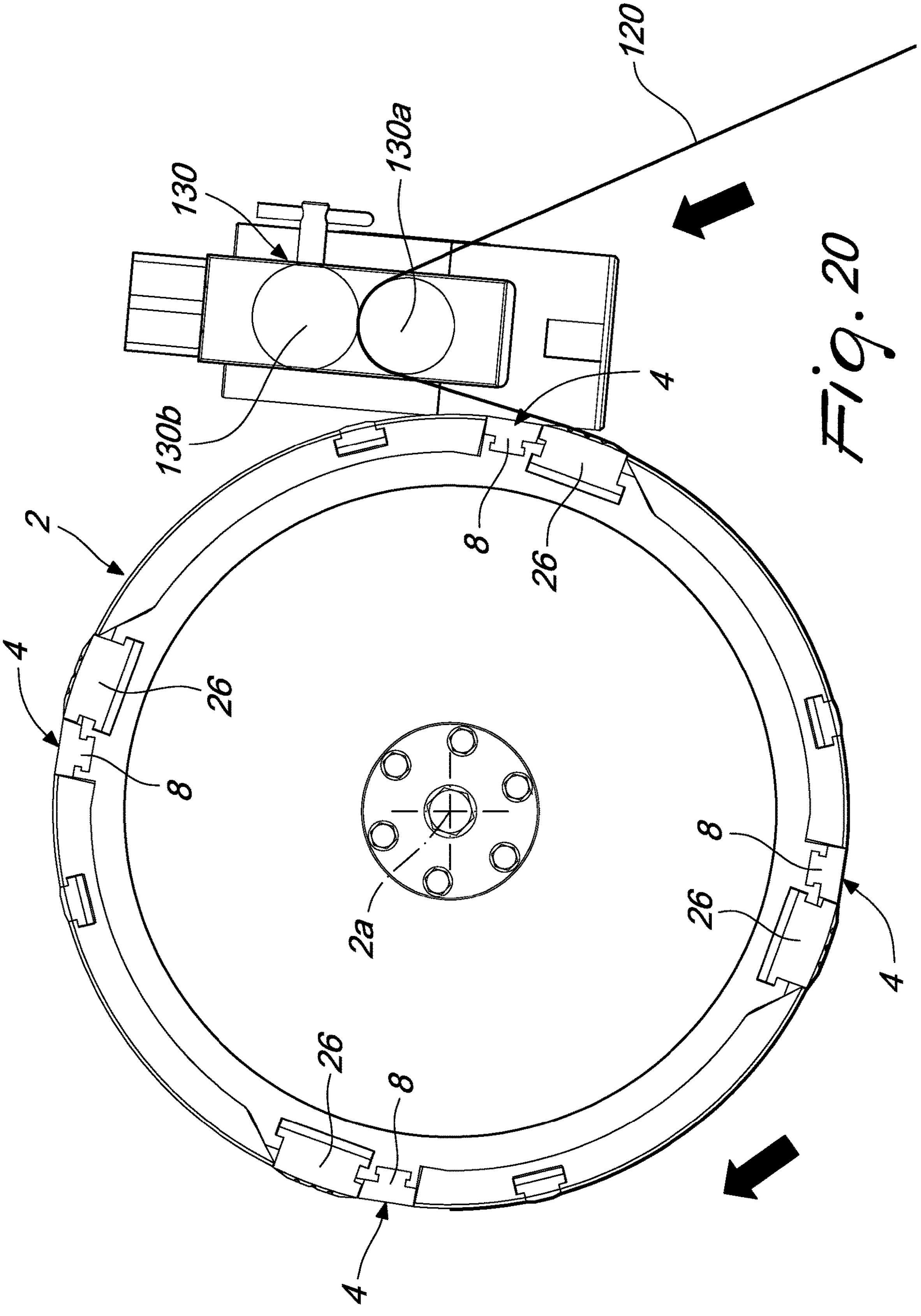
FIG. 20 is a schematic top plan view of the application of the cutting drum according to the invention to a labeling machine.

According to a first embodiment, shown in particular in FIG. 3, in order to allow the deactivation of the detachable retention means of the blade 6 each locking pin 9 can be removed axially from the box-like body 8, so that once the box-like body 8 has been extracted from the accommodation seat 11 it is possible to release the through engagement openings 10 of the blade 6 from the engagement with the locking pins 9 simply by extracting the locking pins 9 from the box-like body 8, so that it is possible to remove subsequently the blade 6 from the suction chamber 5, through the suction opening 12, allowing its easy replacement.

In a second embodiment, shown in FIGS. 5 to 8, the box-like body 8 comprises at least two parts 8*a* and 8*b* which can be mutually separated, once the box-like body 8 has been extracted from the accommodation seat 11, so as to be able to release the blade 6 from the coupling with the detachable retention means and, more particularly, from the engagement with the locking pins 9.

Conveniently, in this case, one of the two parts 8*a*, 8*b* of the box-like body 8, for example the one designed by 8*a*, has the locking pins 9 integrally formed thereon and forms at least one portion of the suction chamber 5, while the other part 8*b* forms the remaining part of the suction chamber 5 and acts as a retention abutment for the blade 6.

Advantageously, the two parts 8*a* and 8*b* of the box-like body 8 can be separated along a plane that is substantially parallel to a diametrical plane of the drum main body 2.

FIGS. 9 to 13 show a third embodiment, in which the only difference with respect to the second embodiment is that the parts 8*a* and 8*b* that compose the box-like body 8 are mutually connected by virtue of elastic return means 19, which are constituted for example by elastically flexible portions provided in the box-like body 8 or by elements made of rubber or other similar material.

In this case, once the box-like body 8 has been extracted from the accommodation seat 11, it is sufficient to move mutually apart the two parts 8*a* and 8*b* of the box-like body 8, overcoming the force applied by the elastic return means 19, in order to allow the release of the blade 6 from the engagement with the locking pins 9 formed integrally on one of the two parts 8*a* and 8*b*.

According to a fourth embodiment, the blade 6 is kept in engagement with the detachable retention means by virtue of the contact of at least one portion thereof with at least one region of the drum main body 2.

In this case, preferably in the part of the box-like body 8 that is directed toward the axis of the drum main body 2, an open rear region 20 is formed laterally to the blade 6 so that the rear portion 6*a* of the blade 6, opposite its cutting edge, can come into contact with a region of the internal wall of the accommodation seat 11 or of the coupling seat 14, when the box-like body 8 is inserted in the accommodation seat, so that the blade 6 is kept in a locked position between the drum main body 2 and the box-like body 8 and in engagement with the locking pins 9.

In this case also, once the box-like body 8 has been extracted from the accommodation seat 11, the blade 6, since it is no longer being kept locked by the contact with the drum main body 2, can be rotated, making its rear portion 6*a* exit from the open rear region 20 defined in the box-like body 8, so as to disengage the locking pins 9 from the through engagement openings 10, allowing therefore the possibility to extract the blade 6 from the suction chamber 5 through the suction opening 12.

It should be noted that the air suction means 7 are, conveniently, provided by a vacuum distribution unit 21, on which the drum main body 2 is rotatably mounted.

In the vacuum distribution unit 21 there is a vacuum chamber 22 connected to a vacuum pump 23 and provided with a vacuum intake opening 24 formed on the face of the vacuum distribution unit 21 directed toward the drum main body 2.

Conveniently, in the box-like body 8 there is, on a face thereof, a communication opening 25, connected to the suction chamber 5 and capable of arranging itself at a passage port 25*a* formed in the drum main body 2, so that with the box-like body 8 inserted in its own accommodation seat 11, upon the passage, during the rotation of the main body 2 about its own axis, of the corresponding cutting device 4 at the vacuum intake opening 24 formed in the vacuum distribution unit 21 the connection between the suction chamber 5 of the box-like body 8 and the vacuum chamber 22 and therefore the vacuum pump 23 is created.

It should also be noted that in the drum main body 2, in front of the accommodation seat 11 of the box-like body 8 of each cutting device 4 along the rotation direction of the drum main body 2, it is possible to provide conveniently a corresponding slider 26, slightly in relief with respect to the remaining part of the lateral surface of the main body 2 which allows, in cooperation with a glue roller, not shown and designed to be arranged laterally to the drum main body 2, to apply the glue to the leading and trailing edges of the labels obtained from the cutting of the label ribbon 120, as already described, for example, in U.S. Ser. No. 10/343,808.

The use of the cutting drum, according to the invention, is as follows.

If it is necessary to replace one of the blades 6 of the cutting devices 4 of the cutting drum according to the invention, one provides, with the main body 2 stationary, the uncoupling of the corresponding box-like body 8 from the drum main body 2 by means of a relative sliding movement between the box-like body 8 and the main body 2 along the sliding direction, until the extraction of the box-like body 8 from the corresponding accommodation seat 11 formed in the drum main body 2 is obtained.

Once the box-like body 8 has been extracted from the accommodation seat 11, the blade 6 is uncoupled from the box-like body 8.

In order to do this, first the detachable retention means of the blade 6 are deactivated, thus uncoupling the locking pins 9 from the through engagement openings 10 formed in the blade 6.

The uncoupling of the locking pins 9 is performed, depending on the embodiments, by extracting the locking pins 9 from the box-like body 8, as in the first embodiment, or by separating the two parts 8*a* and 8*b* that compose the box-like body 8, as in the second and third embodiments, or by rotating the blade 6, so as to make its rear portion 6*a*, which is opposite its cutting edge, exit from the open rear region 20 of the box-like body 8, as in the fourth embodiment.

Once the blade 6 has been released from the engagement with the locking pins 9, the blade 6 is extracted from the suction chamber 5, for example through the suction opening 12.

At this point, a new blade 6 can be inserted in the suction chamber 5 of the box-like body 8 and locked to the box-like body 8 by virtue of the detachable locking means.

In particular, in the case of the first embodiment, in order to lock the new blade 6 to the box-like body 8 one proceeds, after the insertion of the new blade 6 in the suction chamber through the suction opening 12, to couple again the locking pins in the box-like body 8 so that they engage with the respective through engagement openings 10 formed in the new blade 6.

In the case of the second and third embodiment, instead, the new blade 6 is inserted between the two parts 8*a* and 8*b* that compose the box-like body 8, so that the through engagement openings 10 of the new blade 6 engage the locking pins 9 which are integral with one of the two parts 8*a* and 8*b*, and then the two parts 8*a* and 8*b* are joined so as to compose the box-like body 8 again.

It should be noted that in the case of the third embodiment the joining of the two parts 8*a* and 8*b* occurs due to the elastic force applied by the elastic return means.

In the case of the fourth embodiment, instead, the new blade 6 is inserted in the suction chamber 5 in a position that is inclined with respect to the suction opening 12, so as to make the rear portion of the new blade 6 exit from the rear open region that is present in this case in the box-like body 8, and then the blade is rotated so as to arrange it in a position at right angles to the suction opening and so as to engage its through engagement openings 10 with the locking pins 9.

At this point the box-like body 8 can be again coupled to the drum main body 2 by means of the relative sliding movement along the sliding direction, so as to insert the box-like body 8 in the corresponding accommodation seat 11.

In practice it has been found that the invention achieves the intended aim and objects, providing a cutting drum that allows to perform the maintenance of the blades of the cutting drum with a small number of simple operations.

The invention thus conceived is susceptible of numerous modifications and variations, all of which are within the scope of the appended claims; all the details may furthermore be replaced with other technically equivalent elements.

In practice, the materials used, as well as the contingent shapes and dimensions, may be any according to the requirements and the state of the art.

The disclosures in Italian Patent Application No. 102020000022891 from which this application claims priority are incorporated herein by reference.

The invention claimed is:

1. A cutting drum for a labeling machine, comprising: a drum main body, which can move in rotation about an axis thereof and is designed to receive in adhesion on a lateral surface thereof a label ribbon on which multiple labels are printed in succession, along a perimeter of said drum main body there being at least one cutting device which comprises a suction chamber, said suction chamber being open at an outer lateral surface of the drum and accommodating at least one blade, said suction chamber being configured to be connected to air suction means, in order to attract said label ribbon toward an inside of said suction chamber and against said blade, in order to produce a cutting of said label ribbon, wherein said at least one cutting device comprises a body for supporting said blade, wherein said suction chamber is formed in said body, said body being detachably supported by said drum main body, said blade being coupled to said body with detachable retention means; wherein a cutting edge of said blade is recessed radially relative an outwardly facing lateral edge of said suction chamber of said body; wherein said suction chamber is open at both a leading side of said cutting edge and a trailing side of said cutting edge, relative to a rotation direction of the cutting drum; wherein said body is disposed adjacent to a slider supported on said drum main body, and said body is removable from said drum main body while said slider is retained on said drum main body.

2. The cutting drum according to claim 1, wherein said body is configured to be coupled or uncoupled with respect to said drum main body by a relative sliding movement between said body and said drum main body along a sliding direction.

3. The drum according to claim 1, wherein said detachable retention means are extended along at least one retention direction that is substantially perpendicular to a vertical plane of said blade.

4. The cutting drum according to claim 2, wherein said sliding direction is substantially perpendicular to a direction that is substantially radial with respect to the axis of said drum main body.

5. The cutting drum according to claim 2, wherein said sliding direction is substantially parallel to the axis of rotation of said drum main body.

6. The cutting drum according to claim 2, wherein in a peripheral region of said main body there is, for the body of said at least one cutting device, at least one complementarily shaped accommodation seat, said body being removable from or insertable in said accommodation seat by said relative sliding movement.

7. The cutting drum according to claim 6, further comprising means for a detachable snap locking of said body in said accommodation seat which can be activated automatically upon insertion of said body in said accommodation seat.

8. The cutting drum according to claim 1, wherein said detachable retention means comprise at least one locking pin which engages detachably a corresponding through engagement opening formed in said blade.

9. The cutting drum according to claim 1, wherein a suction opening is formed on a face of said body that is open to said outer lateral surface of the drum and communicates with said suction chamber, with said body inserted in said accommodation seat said suction opening being arranged substantially at the lateral surface of said drum main body.

10. The cutting drum according to claim 9, wherein said body is provided with at least one coupling portion which can engage at least one respective coupling seat that is shaped correspondingly, said coupling seat being formed in said main body and communicating with said accommodation seat.

11. The cutting drum according to claim 10, wherein said at least one coupling portion has a substantially dovetail shape.

12. The cutting drum according to claim 10, wherein said at least one coupling portion comprises at least one rib which protrudes from an external surface of said body and is extended substantially parallel to said sliding direction, said at least one rib being insertable in a corresponding groove formed in said coupling seat.

13. The cutting drum according to claim 12, wherein said at least one coupling portion comprises at least one lateral expansion at a free end of said at least one rib, said at least one lateral expansion being engageable in a respective wider region, said wider region being formed in said coupling seat.

14. The cutting drum according to claim 10, wherein said at least one coupling portion is arranged on a side of said body that is opposite with respect to a side in which said suction opening is formed.

15. The cutting drum according to claim 1, wherein said body comprises at least two parts which can be mutually separated in order to release said blade from said detachable retention means.

16. The cutting drum according to claim 15, wherein said parts are mutually connected by elastic return means.

17. The cutting drum according to claim 1, wherein said blade is kept in engagement with said detachable retention means by a contact of at least one portion of said blade with at least one region of said drum main body.

* * * * *